May 16, 1961     D. W. BARGEN     2,984,777
MEANS OF INTERCONNECTING A RESOLVER WITH A STANDARD SYNCHRO
Filed Oct. 25, 1956
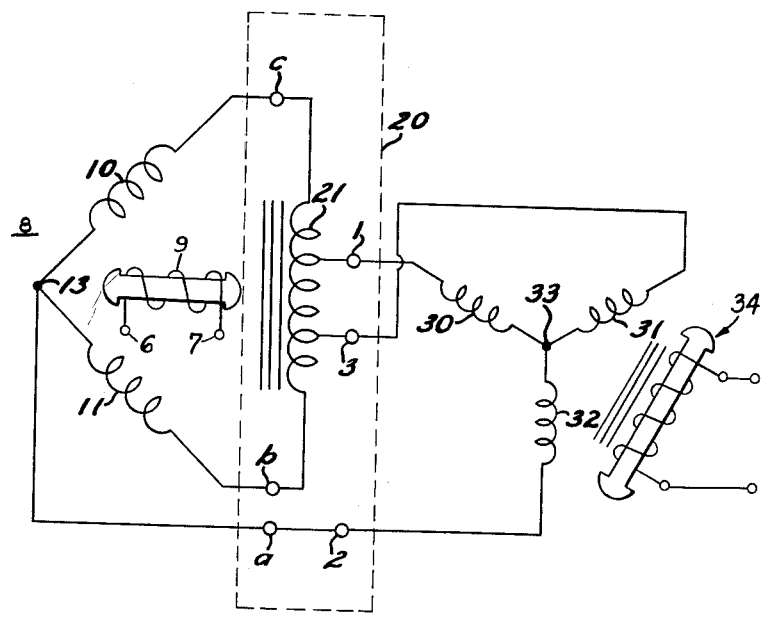
INVENTOR.
DAVID W. BARGEN
BY
ATTORNEYS United States Patent Office 2,984,777
Patented May 16, 1961

2,984,777
MEANS OF INTERCONNECTING A RESOLVER WITH A STANDARD SYNCHRO

David W. Bargen, Northfield, Minn., assignor to Collins Radio Company, Cedar Rapids, Iowa, a corporation of Iowa Filed Oct. 25, 1956, Ser. No. 618,309

5 Claims. (Cl. 318—30)

This invention relates to transformation systems and more particularly to a means for converting the two voltages of a resolver into the three corresponding voltages of a synchro. The two voltages of the resolver have the same frequency and phase, but have magnitudes proportional to the angular position of the rotor. The three voltages of the synchro have the same frequency and phase and have magnitudes corresponding to the angular position of its rotor. This invention will operate using either the synchro or the resolver as the transmitter and using the remaining unit as the receiver.

It is well known in the art that electrical resolvers may be used to transform polar coordinates to rectangular coordinates and vice versa. It has also been well known in the art that synchro generators may be used to transform polar coordinates having a specific angle to rectangular coordinates of the angle. This transformation by the synchro generators is possible if the output of the three voltages having specific relative amplitudes corresponding to particular coordinates is converted to two voltages with amplitudes properly related for application to the two stationary windings of a resolver. It is also well known in the art that if resolver signals are available they may be changed to three signals having amplitudes required for a synchro if a suitable converter is available. Prior systems for accomplishing this conversion have been to connect an alternating current of frequency and voltage suitable for synchro generator use to a rotor winding so as to induce voltages in the related stator windings. The voltages from the stator winding have then been applied to some well-known converted or transformation system such as the Scott transformer. Such a prior art system is shown in detail on page 134, Figures 8–11 of the book "Synchros, Self-Synchronous Devices, and Electrical Servo Mechanisms," by Leonard R. Crow, Scientific Book Publishing Company, Vincennes, Indiana, 1953.

This invention provides a novel method of transformation which reduces to a minimum the number of transformers required.

It is a feature of this invention that better coupling between the resolver and the synchor generator is provided.

Another feature of this invention is the economy of construction resulting partially from reducing critical limits in construction specifications and partially from the simplicity of the design.

It is an object of this invention to provide a transformation system for transforming polar coordinates to rectangular coordinates with a minimum number of transformers.

It is another object of this invention to provide a better transformation means for transforming between polar and rectangular coordinates using a synchro generator which increases the coupling between the generator and the load.

It is still a further object of this invention to provide an improved transformation means between a synchro generator and a resolver, with symmetrical loading of the racks of the resolver, resulting in better linearity of the output signals.

It is still a further object of this invention to provide a novel transformation means between a synchro generator and a resolver where the symmetrical loading of the resolver reduces the critical limits of the resistance of the windings of the transformation means.

These and other objects of this invention will become apparent when the following description is read in conjunction with the drawing of this invention, which consists of a single figure which is a schematic diagram of one embodiment of this invention.

Referring now to the drawing, a resolver 8, which comprises a rotor 9 and a pair of stationary windings 10 and 11. An input signal is applied to a pair of terminals 6 and 7, which are connected to the ends of resolver rotor 9. Resolver stationary windings 10 and 11 are connected through connections $c$ and $b$ to the transformation circuit 20. The two voltages developed across windings 10 and 11 may be either in phase or 180° out of phase with each other and have any amplitude ratio as determined by the position of rotor 9. The transformation circuit 20 consists of a transformer having a winding 21 thereon. The synchro generator includes the three windings 30, 31, and 32 which depict the stator windings of a synchro generator. The amplitude and the polarity of the voltage developed across winding 34 is dependent upon the relative positions of rotor 9 of resolver 8 and rotor 34 of the synchro. As explained below when the present system of transmission is used, the amplitude of the voltages that are supplied to the windings of the synchro from the resolver appears as if the shaft of the resolver were rotated 45° from its actual position so that in certain applications a corresponding correction for the position of the synchro shaft must be applied. The common connection point 13 between the windings 10 and 11 is connected through connection points $a$ and 2 to one end of winding 32. Windings 30, 31, and 32 each have one end connected to a common point 33. The other end of winding 30 is connected to the tap 1 on the transformer winding 21. The other end of winding 31 is connected to tap 3 on the transformer winding 21. The taps 1 and 3 on the transformer winding are theoretically KN turns in from the ends of the winding, where N is the total number of turns, and $$K = \frac{3-\sqrt{3}}{6}$$

From the above description of the configuration of this invention, the operation of this invention will be described. If input voltages having the amplitudes of $$E \cos \theta$$

are applied between the connection points $a$ and $b$ and a voltage with the amplitude $$E \sin \theta$$

is applied between the connection points $a$, $c$, the voltage between connection points 3 and 1 is then $$\sqrt{\tfrac{2}{3}}E \sin \phi$$

The voltage between connection points 1 and 2 is then $$\sqrt{\tfrac{2}{3}}E \sin (\phi-120°)$$

and the voltage between the connection points 2 and 3 is then $$\sqrt{\tfrac{2}{3}}E \sin (\phi+120°)$$

The above equations of the magnitude of the input and output voltages are based upon the assumption that $$\phi = \theta - 450$$

The phase shift of 45 degrees in the voltages which is now obvious from the above equations is an essential characteristic of this invention. Therefore, if this invention is to be used, the shaft of either the resolver or synchro generator should be rotated mechanically 45 degrees to provide correct transmission of voltages.

In one particular embodiment of this invention which has been constructed, the transformer was a toroid transformer with 3000 turns of No. 35 wire wound on the toroid. This winding was tapped at 634 turns and 2366 turns for the connection points 1 and 3 of the figure. Using this invention, the difference between the theoretical and actual angles of the resolver shaft and the synchro generator shaft was never more than 0.2 of a degree in error regardless of the load placed on the system. Although this invention has been described with respect to a particular embodiment thereof, it is not to be so limited, as changes and modifications may be made therein which are within the full intended scope of the invention, as defined by the appended claims.

What is claimed is:

1. A system for adapting the voltage output of a resolver to that of a synchro comprising a resolver means including at least two windings having a common connection point, a transformation means including a winding having each of its ends connected to another connecting point on respective windings of said resolver means, a synchro means including three windings, said synchro means having two windings connected to taps intermediate the ends of the winding of said transformation means and the third winding of said synchro connected to said common connection point.

2. A system for adapting the voltage output of a resolver to that of a synchro comprising a resolver means, said resolver means including two windings having one end of each winding connected to a common connection point, a transformer including a winding having its ends connected to the other end of each of said resolver windings, said transformer having taps intermediate the ends of said winding, a synchro means including three windings with one end of each of the three windings connected to a common point, the other end of two of the synchro windings connected individually to one of said taps and the third winding of said synchro connected to the common connection point of said resolver windings.

3. A system for adapting the voltage output of a resolver to that of a synchro comprising a resolver means including a first and a second winding, said first and second windings having one end connected together in a common connection point, a transformer means including a winding with the ends of said winding individually connected to the remaining ends of said first and second resolver windings, tap connections intermediate the ends of said transformer windings, said tap connections being KN turns from the ends of the winding, where N is the total number of turns and K is $$\frac{3-\sqrt{3}}{6}$$

synchro means including three windings, said windings having one end of each winding connected together in a common connection point, the other end of two of said windings individually connected to said tap connections and the other end of said third winding connected to the common connection point of said resolver windings.

4. A system for adapting the voltage output of a resolver to that of a synchro including a synchro means having three windings, a common connection point where one end of each of said windings is connected, transformer means including a winding with taps at KN turns from the ends of said winding where K is $$\frac{3-\sqrt{3}}{6}$$

and N is the total number of turns, resolver means comprising a first and a second winding, each of said windings having one end connected to the ends of said transformer means and the other end of each of said windings connected to a common connection point, two of the windings of said synchro means having their other ends connected individually to the tap connections on said transformer, the third winding of said synchro means having its other end connected to the common connection point of said resolver windings.

5. A means for adapting the voltage output from a resolver to that of a synchro and vice versa comprising a transformer including a winding, tap connections intermediate the ends of said winding, said tap connections being KN turns from the ends of the winding where N is the total number of turns and K is $$\frac{3-\sqrt{3}}{6}$$

whereby, when the ends of said winding are connected to the output of said resolver and the taps of said winding are operably connected to two of the three outputs of said synchro and a third output of said synchro is connected to the common output of said resolver, said synchro will follow the angular settings of said resolver.

References Cited in the file of this patent
UNITED STATES PATENTS 2,452,784    Noodleman    Nov. 2, 1948
2,866,969    Takeuchi et al.    Dec. 30, 1958

FOREIGN PATENTS 116,442    Switzerland    Sept. 1, 1926